2,905,726

INHIBITION OF HCl-OLEFIN REACTION

Joel F. M. Leathers, Freeport, and Bob Posey, Jr., Lake Jackson, Tex., assignors to The Dow Chemical Company, Midland, Mich., a corporation of Delaware No Drawing. Application July 11, 1958
Serial No. 747,855

15 Claims. (Cl. 260—654)

This invention relates to means for inhibiting the addition of HCl to olefinic double bonds.

In the high-temperature chlorination of olefins, the substitution reaction predominates, the primary products being chloro-olefins. However, at the low temperatures at which the chloro-olefins are most easily separated from the byproduct HCl, the HCl readily adds to the chloro-olefin to produce undesired polychloroalkanes. Heretofore, there was no satisfactory method available for inhibiting this undesired secondary reaction.

It has now been discovered that dioxane is a potent inhibitor for the addition of HCl for olefins and, as such, is highly effective in inhibiting the undesired addition of HCl to chloro-olefins.

While it is well known that dioxane and HCl form an addition compound, the formation of such a compound apparently cannot explain the inhibitory effect of the present invention because only a small amount of dioxane, far less than the stoichiometric amount, is sufficient to produce the desired inhibition.

Although one of the most valuable applications of the invention is in the prevention of an addition reaction between HCl and chloro-olefins as produced in the high-temperature chlorination of olefins or chloro-olefins, equally effective results are obtained in other processes wherein HCl and an olefin are in contact under conditions such that in the absence of an inhibitor the HCl would add to the double bond of the olefin.

In the practice of the invention, it is usually sufficient to add to the HCl-olefin mixture to be inhibited about 0.5 to 5%, by weight, of dioxane. This amount is not critical, however. Lower amounts usually have substantially reduced effectiveness while larger amounts have little additional inhibitory effect and entail higher costs and more complicated separation and recovery techniques.

The inhibitor of the invention is effective at temperatures below about 20° C. and especially below 0°. In the chlorination of olefins to produce chloro-olefins it is advantageous to separate the organic products from the byproduct HCl by cooling the mixture to about —15 to —30° C., thus condensing the organic products while leaving HCl as a gaseous phase. Some of the HCl dissolves in the condensate and will react with the olefinic constituents thereof in the absence of an inhibitor. In this temperature range of —15 to —30° C. dioxane is exceedingly effective as an inhibitor and substantially prevents any extensive reaction between the HCl and olefin.

The effectiveness of dioxane is illustrated by the following comparative examples which simulate the conditions ordinarily encountered in the condenser of an olefin chlorination process unit.

Example 1

When a mixture of propylene and HCl (1:1.3 molar ratio) was fed through a steel tube under a pressure of 150 p.s.i.g., at a temperature of —15° C., and with a residence time of 60 min., 70% of the propylene was converted to isopropyl chloride.

Example 2

When the experiment of Example 1 was repeated except that 2%, by weight, of dioxane was added to the mixture, only 4% of the propylene was converted to the chloride.

Results similar to those of Example 2 are obtained when the propylene is replaced with allyl chloride, 2-chloropropene, 2,3-dichloro-1-propene, the chlorinated butenes, particularly chloroprene, isobutylene, 2-butene, 3-butene, and other olefins and chloro-olefins.

We claim:

1. A process for inhibiting the addition of HCl to the double bond of an olefinic compound with which said HCl is in contact under conditions under which such addition normally occurs comprising mixing with said HCl and olefinic compound about 0.5 to 5%, by weight, of dioxane.

2. A process as defined in claim 1 wherein the olefinic compound is propylene.

3. A process as defined in claim 1 wherein the olefinic compound is allyl chloride.

4. A process as defined in claim 1 wherein the olefinic compound is 2-chloropropene.

5. A process as defined in claim 1 wherein the olefinic compound is 2,3-dichloro-1-propene.

6. A process as defined in claim 1 wherein the olefinic compound is a chlorinated butene.

7. A process as defined in claim 1 wherein the olefinic compound is chloroprene.

8. A process as defined in claim 1 wherein the temperature is about 0° to —30° C.

9. A composition comprising substantially anhydrous HCl, an olefinic compound normally reactive with HCl, and as a reaction inhibitor therefor, about 0.5 to 5%, by weight, based on the entire mixture, of dioxane.

10. A composition as defined in claim 9 wherein the olefinic compound as allyl chloride.

11. A composition as defined in claim 9 wherein the olefinic compound is propylene.

12. A composition as defined in claim 9 wherein the olefinic compound is 2-chloropropene.

13. A composition as defined in claim 9 wherein the olefinic compound is 2,3-dichloropropene.

14. A composition as defined in claim 9 wherein the olefinic compound is a chlorinated butene.

15. A composition as defined in claim 9 wherein the olefinic compound is chloropropene.

References Cited in the file of this patent

UNITED STATES PATENTS

| | | |
|---|---|---|
| 2,615,791 | Raley | Oct. 28, 1952 |
| 2,811,252 | Bochtel | Oct. 29, 1957 |